United States Patent [19]

Black et al.

[11] 3,920,476

[45] Nov. 18, 1975

[54] ELECTRODE GAP CONTROL FOR ELECTRO CHEMICAL BATTERIES AND HEAT GENERATION SYSTEMS

[75] Inventors: Stanley A. Black, Port Hueneme; Sergius S. Sergev, Ventura, both of Calif.

[73] Assignee: The United States of America as represented by the Secretary of the Navy, Washington, D.C.

[22] Filed: Sept. 19, 1974

[21] Appl. No.: 507,653

[52] U.S. Cl. .............................. 136/100 R; 126/263
[51] Int. Cl.² ........................................ H01M 17/00
[58] Field of Search ..... 136/100 M, 100 R, 83, 6 R, 136/6 B, 111, 114; 126/263

[56] References Cited
UNITED STATES PATENTS

| | | | |
|---|---|---|---|
| 2,938,066 | 5/1960 | Weigand | 136/161 |
| 2,976,342 | 3/1961 | Morehouse et al. | 136/100 R |
| 3,527,612 | 9/1970 | Eisenberg | 136/6 R |
| 3,536,535 | 10/1970 | Lippincott | 136/6 R X |
| 3,657,017 | 4/1972 | Ketler, Jr. | 136/100 R |
| 3,730,776 | 5/1973 | Geisler, Jr. | 136/100 R |

*Primary Examiner*—John H. Mack
*Assistant Examiner*—C. F. Lefevour
*Attorney, Agent, or Firm*—Richard S. Sciascia; Joseph M. St.Amand

[57] ABSTRACT

A simple and economical means for controlling the electrode gap in an electrochemical cell that depends on the gap for control of power output. As the anode is consumed, a conical spacer attached to the cathode is allowed to move into a conical hole in the anode, thus controlling the electrode gap.

10 Claims, 5 Drawing Figures

FIXED PLATE SPACING

FIXED PLATE SPACING AFTER ANODE IS PARTIALLY CONSUMED

ELECTRODE GAP CONTROL FOR ELECTRO CHEMICAL BATTERIES AND HEAT GENERATION SYSTEMS

This invention is related to copending U.S. Patent application, Ser. No. 507,645 filed herewith on Sept. 19, 1974 for ELECTROCHEMICAL ENERGY SOURCE FOR DIVER SUIT HEATING.

BACKGROUND

This invention is related to control of spacing between consumable electrodes in an electrochemical energy source. The electrochemical reaction between an active metal such as magnesium and a passive metal such as iron in an electrolyte such as seawater has been used for the production of electrical energy in seawater batteries and also for the production of heat in a magnesium seawater diver heater as disclosed in the aforementioned patent application.

This electrochemical reaction has also been used for the production of hydrogen gas for ocean buoyancy control. Prior systems have utilized non-adjustable plate spacing, i.e., electrode gap, or provided some mechanical means of adjusting plate spacing through use of springs and powered or hand operated actuators.

FIG. 1 shows the general configuration of an electrochemical cell with non-adjustable plate spacing. The cell consists of a cathode 10, anode 12, spacer 13 and electrode gap 14. The anodic material 12 adjacent to the cathode material 10 is consumed over a period of time and in the process produces heat, or electrical energy, and/or gas such as hydrogen. FIG. 2 shows that the electrode gap 14 increases after use, by the thickness of the anode material consumed. The anode material is not consumed in the area of contact with the spacer because of exclusion of electrolyte in the contact area 15. The reaction rate is a function of the electrode gap 14. As the gap increases, if all other operational parameters are held constant, the reaction rate decreases with a resulting drop in power output. Thus, if it is desired to maintain a constant reaction rate, or even to vary the reaction rate, some method is necessary to reduce or eliminate the power decrease resulting from an increasing electrode gap.

Previous electrochemical cells have used a number of techniques in attempts to provide a constant electrode gap. In one instance, a spacer fabricated from a consumable anodic material in the shape of a cone was used. In theory, as the anode spacer is consumed the electrode gap would decrease. This technique requires complex shapes, determined by the local reaction rates along the spacer surface, to be machined on or cast with the anode to provide predictable gap control. However, there are problems associated with anode materials in direct contact with the cathode as described in the aforementioned application. Essentially, the gap control is determined by a reaction other than the main reaction which is to be controlled.

Using a positive, mechanically actuated spacing control system provides precise control of the reaction. However, where weight and simplicity of operation are important, as in diver heater applications, the added weight and complexity of an actuator system are undesirable. Other methods which have been used to control the reaction rate such as varying temperature of the electrolyte and varying the anode area adjacent to the cathode are complicated and increase system weight and volumetric efficiency. In addition, these systems are costly to design and fabricate.

SUMMARY OF THE INVENTION

The present invention provides a simple and economical means for controlling the electrode gap in an electrochemical cell that depends on the gap for control of power output. As the anode is consumed, a conical spacer attached to the cathode is allowed to move into a conical hole in the anode, thus controlling the electrode gap.

The device disclosed herein offers a simple, reliable, and economical approach to maintaining a constant reaction rate, other parameters being constant, in electrochemical batteries, heaters, or hydrogen generators which utilize a consumable anode and inert cathode immersed in a liquid electrolyte. No complicated electrical or mechanical control systems are utilized. The spacing control rate can be preset to adjust for other cell parameters which might influence cell output over a period of time. The rate of spacing control is dependent only upon the basic reaction proceeding at any rate and upon the geometry of the spacers which is independent of the basic reaction rate. This technique offers a compact and lightweight system which provides a means of minimizing cell size and weight such as is needed in the case of using the magnesium/iron cell to produce heat at a constant rate for divers.

It is an object of the invention, therefore, to provide a simple, reliable, efficient, and compact means of maintaining a known or desired electrode gap between anodic and cathodic plates in applications such as electrochemical batteries, heat sources, or gas generators.

Other objects, advantages and novel features of the invention will become apparent from the following detailed description of the invention when considered in conjunction with the accompanying drawings.

DESCRIPTION OF THE INVENTION

Figure 1:
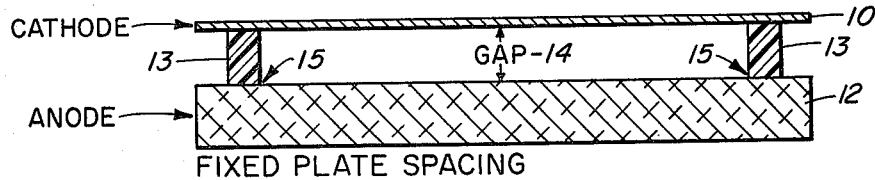
FIG. 1 shows the general cross-sectional view of an electrochemical cell with non-adjustable electrode plate spacing.
Figure 2:
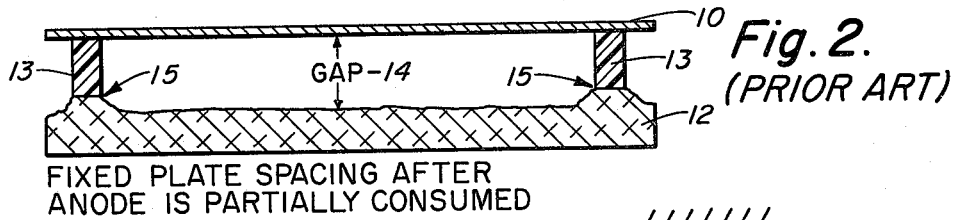
FIG. 2 shows an increase in the electrode gap of the cell of FIG. 1, as the anode material is consumed.
Figure 3:
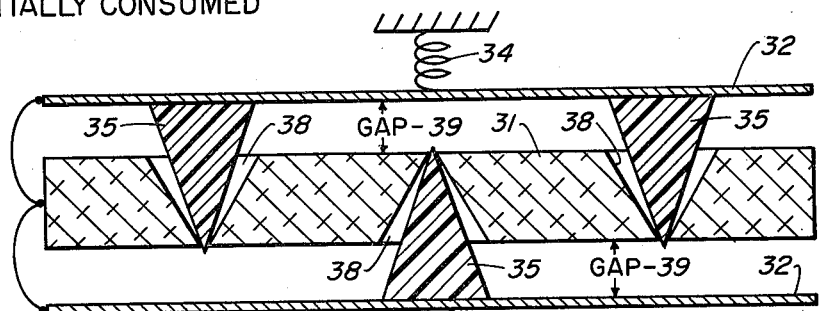
FIG. 3 illustrates an embodiment of the present invention diagrammatically showing in cross-section the arrangement for a single typical cell.
Figure 5:
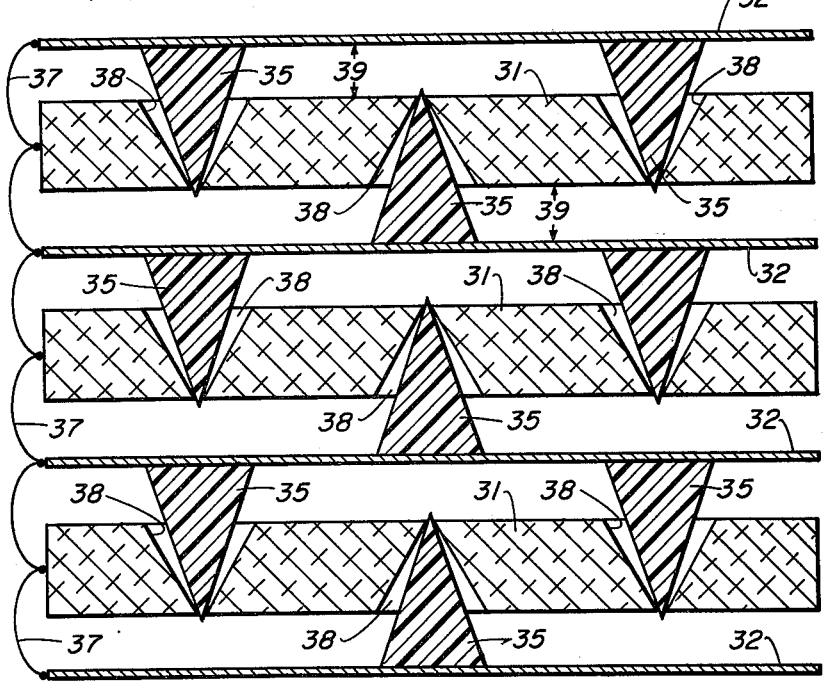
FIG. 5 shows a plurality of cells, as in FIG. 3, stacked together.

The following describes a heat producing application for the invention, such as for diver suit heaters discussed in the above mentioned copending patent application. The invention also is related to and has application for producing electrical energy or hydrogen gas. The normal consumption of anode material at the anode surface is utilized to provide control of the electrode gap between the anode and cathode elements. FIG. 3 shows the arrangement for a typical cell having an anode element 31 with a cathode element 32 on each side. Any number of cells may be stacked together consisting of alternately placed anode elements 31 and cathode elements 32, as shown in FIG. 5. Spring means 34, for example, can be used to provide a loading force against the end plates 32. Inert spacers 35, made from plastic materials for example are attached to the cathode plates 32. Flexible electrical short-circuit elements 37, of brass for example, electrically connect the anode and cathode plates together. The number of spacers 35 and their location depend upon the size and thickness of the plates and the rigidity needed. Normally the anode is much thicker than the cathode since only the anode electrode is consumed. The tips of spacers 35 lift into chamfers 38 formed in the anode plate 31, as shown in FIG. 3. The included angle of chamfer 38 is greater than that of spacer cone 35. The amount of travel required over an operating period for a cell, to maintain a constant electrode gap 39, determines the relationship between the angle of spacers 35 and the angle of the chamfers 38. An electrolyte fills the spaces between the electrode elements. For example, in a seawater battery or diver's suit heater system the anode can be magnesium, the cathode iron, and the electrolyte seawater. Other suitable materials can also be used.

Figure 4:
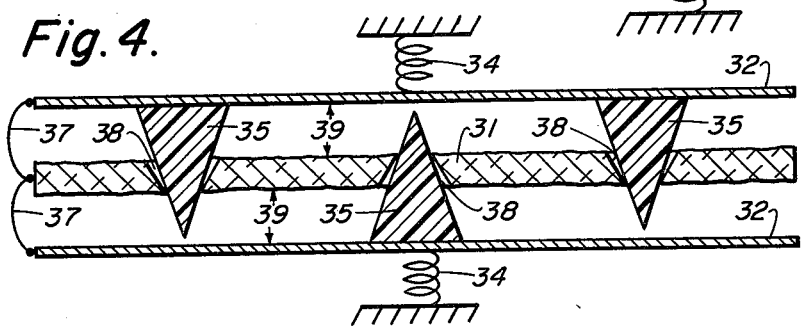
FIG. 4 illustrates how the electrode gap remains constant as the anode in the cell of FIG. 3 is consumed.

As material is consumed from the surface of the anode element 31 by electrochemical reaction, the bearing or contact point 40 on spacer cone 35 will move to match the new anode surface in the chamfer hole and maintain the same electrode gap, as shown in FIG. 4. spring means 34 provide the force which move the plates as the spacer cone 35 moves through the chamfer hole to maintain constant spacing between the anode and cathode plates. The operation is relatively simple in that the electrode gap 39 is automatically adjusted as anode material is consumed from the surface of the anode 31 and chamfer hole 38. In essence, the hole size in the anode chamfer 38, in which contact point 40 fits, increases as the anode material is consumed and the spring pressure allows the cathode plate 32 to maintain the same spacing from the anode plate 31.

For the heat producing application, such as for diver suit heating apparatus, the spacer cone 35 and chamfer 38 angles are designed, as described above, so that the electrode gap remains constant thus maintaining a constant reaction rate. However, the spacer cone and chamfer angles can be adjusted, as desired, to provide decreasing spacing, constant spacing, or increasing spacing with time to suit the needs of the user. This system is particularly suitable for use with cells using a magnesium anode, iron cathode and seawater electrolyte.

Other materials can be substituted for the inert cone spacer 35 described herein. For example, use of a cathodic material for the spacer would provide more rapid spacing changes. Other shapes of the spacer and chamfer can be used in place of the cone; for example, a curved surface such as a sphere could be used in place of the cone when a non-linear spacing control is desired. Reversing the position of each spacer to the opposite side of the cell chamber so that the point of the cone enters from the apex end of the chamfer hole is also possible.

Obviously many modifications and variations of the present invention are possible in the light of the above teachings. It is therefore to be understood that within the scope of the appended claims the invention may be practiced otherwise than as specifically described.

What is claimed is:

1. An electrode gap control system comprising electrochemical energy producing cells having a consumable anode and an inert cathode immersed in a liquid electrolyte, the improvement comprising:
   a. at least one anode electrode and at least one cathode electrode;
   b. a plurality of electrode spacer means mounted on and projecting from said at least one cathode electrode for spacing said at least one cathode electrode from said at least one anode electrode;
   c. the width of each said projecting spacer means becoming gradually narrower as it extends from the cathode electrode surface until it reaches its apex;
   d. a plurality of chamfered holes in the anode electrode, equal to and matching respective spacer means on the adjacent surface of the cathode electrode, in which the respective apex ends of said spacer means seat;
   e. the included angle of said chamfered holes being greater than the included angle formed by the sides of said spacer means;
   f. means for providing a loading force on said anode and cathode electrodes in a direction toward each other;
   g. the apex of said spacer means traveling through said chamfered holes as the surface of the anode electrode is consumed by electrolytic action, resulting in the chamfered holes becoming larger and thereby automatically adjusting the spacing between said anode and cathode electrodes.

2. A system as in claim 1 wherein said spacer means are cone shaped.

3. A system as in claim 1 wherein said spacer means is made from inert material.

4. A system as in claim 1 wherein said spacer means is made from a hard plastic material.

5. A system as in claim 1 wherein the chamfer angle of said chamfered holes and the spacer means apex angle can be adjusted to provide any of constant, increasing, decreasing, and non-linear control of the spacing between the anode and cathode electrodes.

6. A system as in claim 1 wherein the amount and rate of travel over an operating period for a cell is determined by the relationship between the degree of the chamfer angle of said chamfered holes and the degree of the angle of the sides of said spacer means.

7. A system as in claim 1 wherein the apex end of said spacer means seat in and extend into said chamfered holes from the narrowest opening therein.

8. A system as in claim 1 wherein said anode and cathode electrodes are electrically short-circuited.

9. A system as in claim 1 wherein said spacer elements are made from the cathode material.

10. A system as in claim 1 wherein a plurality of alternating anode and cathode electrodes are stacked together, said cathode electrodes having said spacer means protruding toward said anode electrodes and said anode electrodes having chamfered holes from both sides thereof, the outer electrodes at each end of said stack being cathodes against which said loading forces are applied.

* * * * *